US006227499B1

(12) United States Patent
Jennison et al.

(10) Patent No.: US 6,227,499 B1
(45) Date of Patent: May 8, 2001

(54) ROUGH-IN MOUNTING BRACKET FOR CEBUS TAP POINT UNIT

(75) Inventors: Michael T. Jennison, Bridgeville; Gary Maleski; Carl C. Sandulli, Jr., both of Pittsburgh, all of PA (US)

(73) Assignee: Jennison Trust Holdings, Pittsburgh, PA (US)

( * ) Notice: Subject to any disclaimer, the term of this patent is extended or adjusted under 35 U.S.C. 154(b) by 0 days.

(21) Appl. No.: 08/702,272

(22) Filed: Aug. 23, 1996

(51) Int. Cl.[7] ........................................................ G12B 9/00
(52) U.S. Cl. ........................................... 248/27.1; 248/906
(58) Field of Search ................................ 248/906, 27.1, 248/27.3, 300; 220/3.2, 3.3, 3.5, 3.9, 3.92; 174/53, 55, 66, 67; 439/536

(56) References Cited

U.S. PATENT DOCUMENTS

| 4,576,302 | * | 3/1986 | Smolik ............................. 248/906 X |
| 5,178,350 | * | 1/1993 | Vink et al. ....................... 248/906 X |
| 5,263,676 | * | 11/1993 | Medlin, Jr. et al. ............ 248/906 X |
| 5,354,953 | * | 10/1994 | Nattel et al. ..................... 220/3.3 X |
| 5,598,998 | * | 2/1997 | Lynn ................................ 248/906 X |
| 5,651,696 | * | 7/1997 | Jenninson .......................... 439/536 |

* cited by examiner

*Primary Examiner*—Ramon O. Ramirez

(57) ABSTRACT

Generally, the present invention provides a mounting or "rough in" bracket comprising a border surrounding an opening of a size and shape to accept for mounting one or more CEBUS tap point units adjacent to at least one standard electrical receptacle such as a switch or electrical outlet.

17 Claims, 6 Drawing Sheets

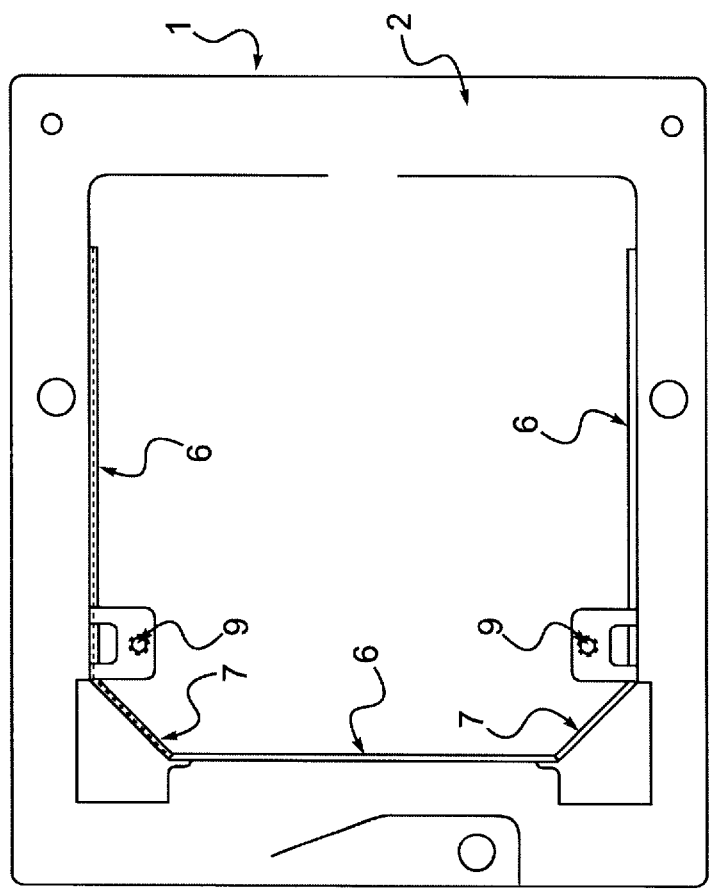
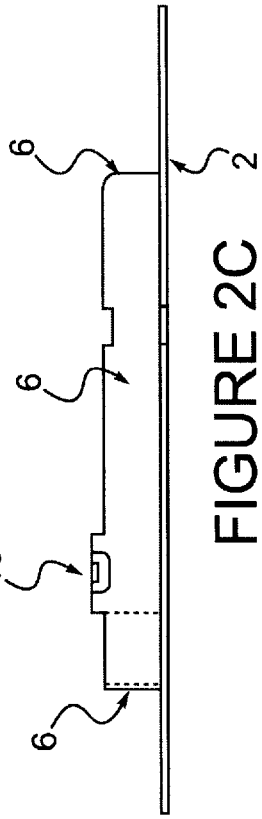
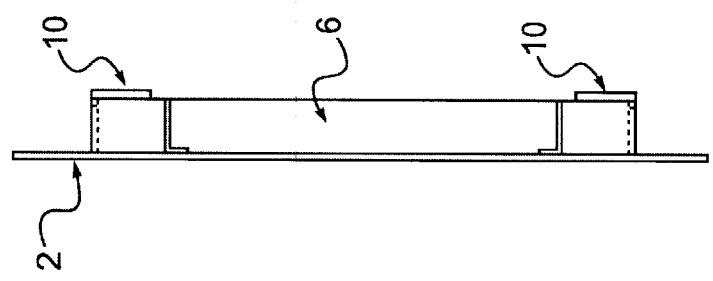

ROUGH-IN MOUNTING BRACKET FOR CEBUS TAP POINT UNIT

FIELD OF THE INVENTION

The invention relates to a mounting bracket for an electrical outlet and, in particular, to a mounting bracket for a tap point unit which is compliant with the EIA-600 CEBUS standard.

BACKGROUND OF THE INVENTION

Electrical outlet boxes and support facia are well known. These outlets are used to connect electrical appliances to the house or building circuits or used to control various components within an electrical circuit such as electric lights.

Because of the need to handle more than electrical appliances, the Electronic Industry Association adopted a BUS standard (EIA-600 CEBUS) for new residential construction. The standard incorporates various communication protocols to accommodate coaxial and twisted pair cabling, powerline and radio frequency medias. The standard addresses a very wide array of communication media.

To utilize the CEBUS standard, new components are necessary. One such component is disclosed in "U.S. patent application Ser. No. 430,240 (issued as U.S. Pat. No. 5,651,696)", which provides a CEBUS compliant tap point unit for mounting coaxial and twisted pair cabling at a standard electrical outlet box. The present invention provides a mounting or "rough in" bracket for housing one or more CEBUS tap point units similar to that disclosed in U.S. Pat. No. 5,651,696 next to at least one standard wall mounted electrical receptacle such as a switch or an electrical power outlet.

Accordingly, it is an object of the present invention to provide a mounting or "rough in" bracket for a CEBUS tap point unit which is fully compliant with the EIA CEBUS standard.

Another object of the present invention is to provide a mounting "rough in" bracket for installing one or more CEBUS tap point units next to at least one standard wall mounted electrical receptacle such as a switch or an electrical power outlet.

Another object of the present invention is to provide a mounting "rough in bracket which is simple to make and relatively easy to install and use in the field.

SUMMARY OF THE INVENTION

Generally, the present invention provides a mounting or "rough in" bracket comprising a border surrounding an opening of a size and shape to accept for mounting one or more CEBUS tap point units adjacent to at least one standard electrical receptacle such as a switch or electrical outlet.

The "rough in" bracket is aligned over the electrical receptacle box by means of a first set of openings located in the border of the bracket that mate with screw holes located in the receptacle box. The rough in bracket is secured to the wall through a separate second set of openings also located in the border of the bracket. The bracket contains at least one flange attached to the border and surrounding the opening for supporting the mounted CEBUS tap point units and electrical receptacles. The rough in bracket optionally contains at least one first tab disposed opposite each other for supplementing the support provided to each CEBUS tap point unit by the flanges. The rough in bracket also optionally contains at least one second tab to provide a tie off point for any extraneous unconnected wire remaining from installation of the tap point and electrical receptacle wiring. After installation of the CEBUS tap point units and the electrical receptacles the mounting bracket is covered by a standard electrical receptacle face plate sized to encompass both the CEBUS tap point units and the electrical receptacles.

Other advantages of the invention will be apparent from a perusal of the following detailed description of a presently preferred embodiment taken in connection with the accompanying drawings.

BRIEF DESCRIPTION OF THE DETAILED DRAWINGS

FIG. 2A is a front elevation view of the present invention as configured for installation.

FIG. 2B is a side elevation view of the present invention as configured for installation.

FIG. 2C is a overhead view of the present invention as configured for installation.

DETAILED DESCRIPTION OF THE PREFERRED EMBODIMENTS

Figure 1:
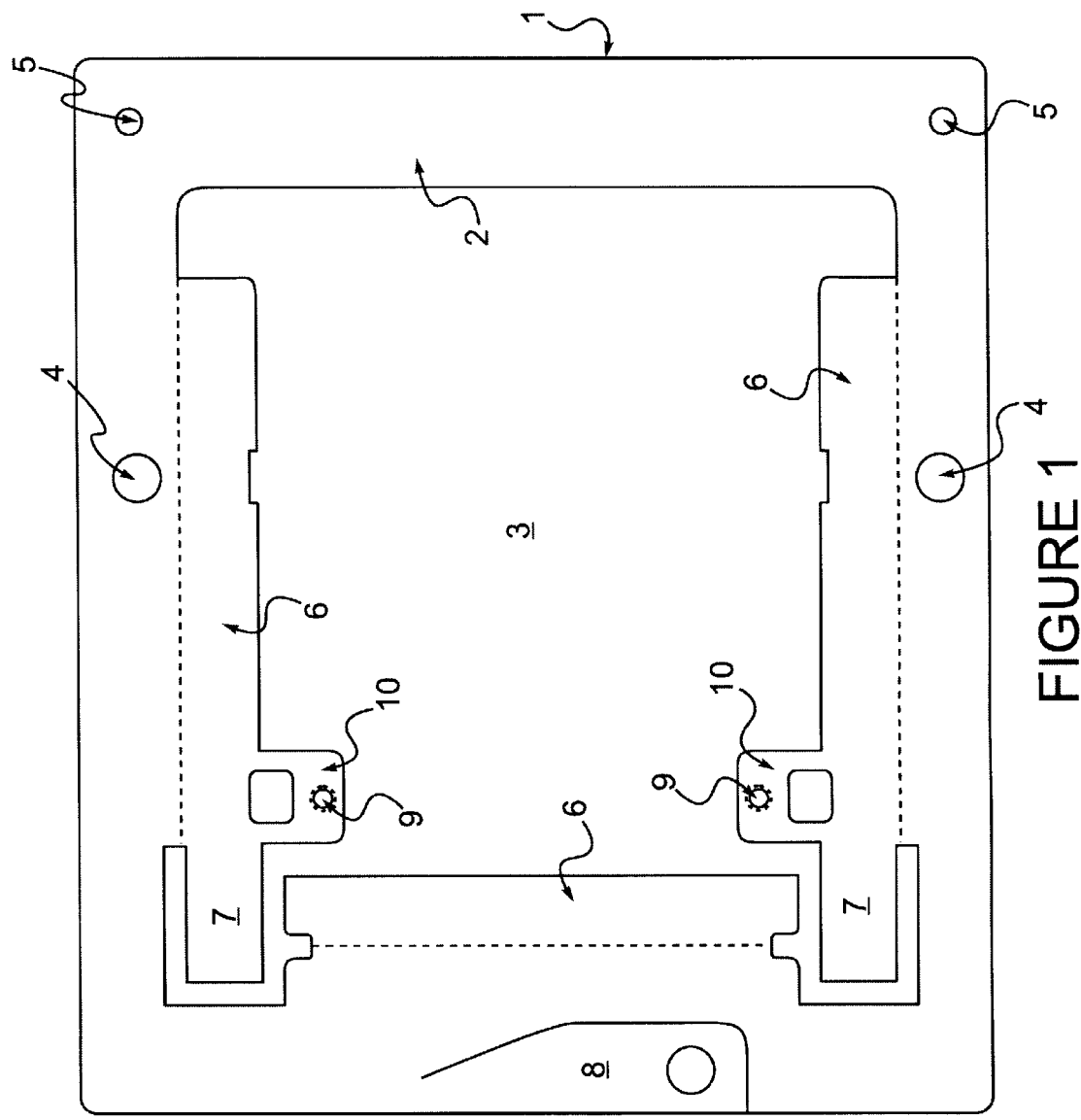
FIG. 1 is a front elevation view of the present invention sized to accept a single CEBUS tap point unit in combination with a single standard electrical receptacle.

Referring to FIGS. 1 and 2A–2C, an embodiment of the invention providing a bracket 1 for wall mounting a single CEBUS tap point unit adjacent to a single standard electrical receptacle is shown. The "rough in" bracket 1 comprises border 2, preferably made of metal or other substances rigid enough to support the tap point unit and electrical receptacle, surrounding an opening 3 of a size and shape to accept for mounting a single CEBUS tap point unit, preferably of a design similar to that shown in U.S. Pat. No. 5,651,696, the disclosure of which is incorporated by reference herein, adjacent to a single standard electrical receptacle, such as a dual pole electrical lighting switch or a 115 VAC electrical power outlet. The bracket 1 is preferably aligned over the box containing the electrical receptacle by means of at least one first set of openings 4 located in the border 2 that mate with screw holes located in the receptacle box. The bracket 1 is preferably secured to the wall through at least one separate second set of openings 5 also located in the border 2. The CEBUS tap point unit is preferably attached to the bracket 1 through at least one separate third set of openings 9 mounted to a tab 10 aligned with screw holes in the CEBUS tap point unit. The bracket 1 preferably contains at least one flange 6 attached to the border 2 for at least partially surrounding the opening 3 to support the mounted CEBUS tap point unit and electrical receptacle. The bracket preferably contains at least one first tab 7 for supplementing the support provided to each CEBUS tap point units by the flanges 6. The rough in bracket also preferably contains at least one second tab 8 to provide a tie off point for any extraneous unconnected wire remaining from installation of the tap point and electrical receptacle wiring. After installation of the CEBUS tap point unit and the electrical receptacle the mounting bracket is covered by a standard two-gang electrical receptacle face plate sized to enclose both the CEBUS tap point units and the electrical receptacles.

Figure 3:
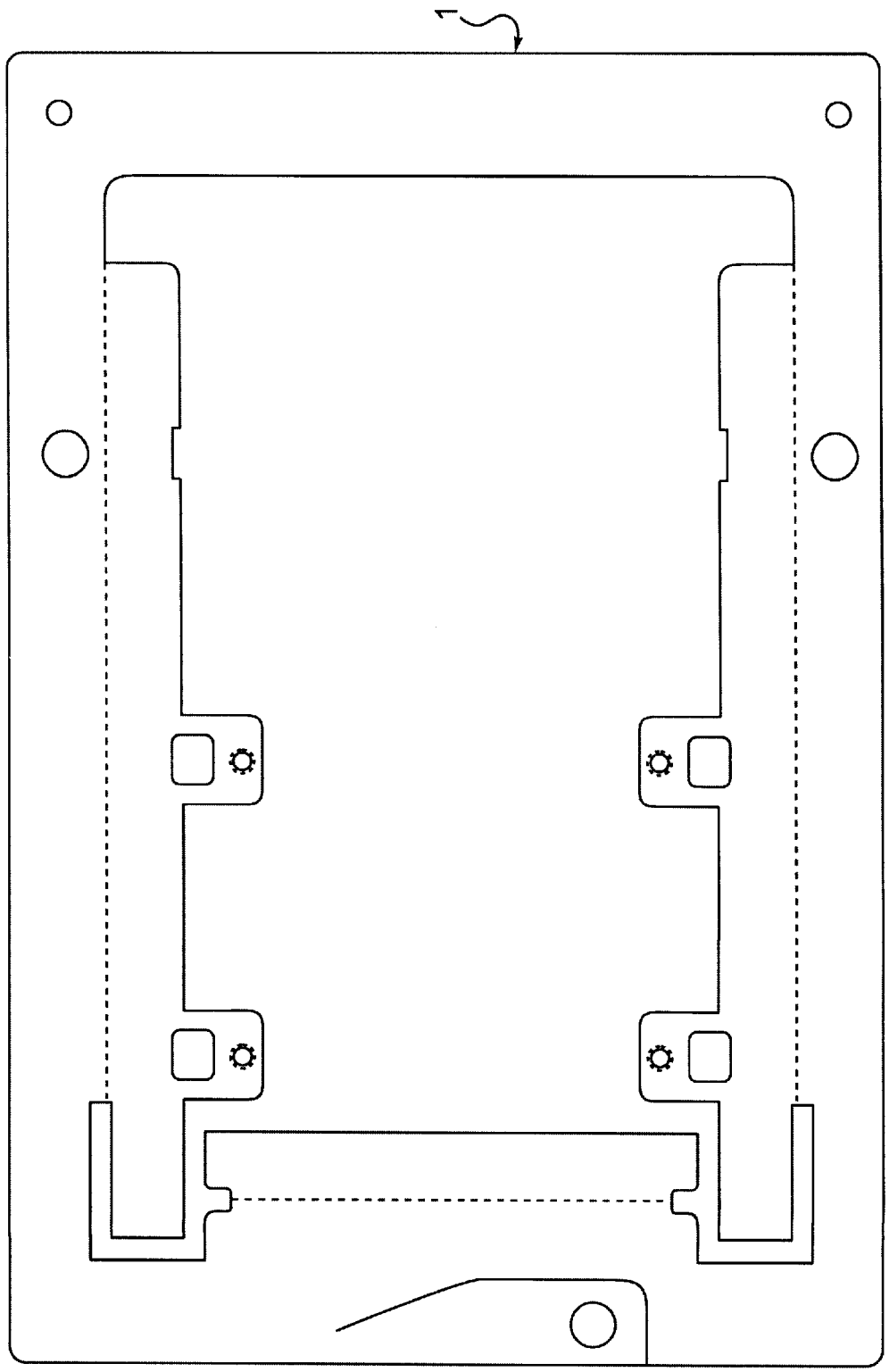
FIG. 3 is a front elevation view of the present invention sized to accept two CEBUS tap point units in combination with a single standard electrical receptacle.
Figure 4:
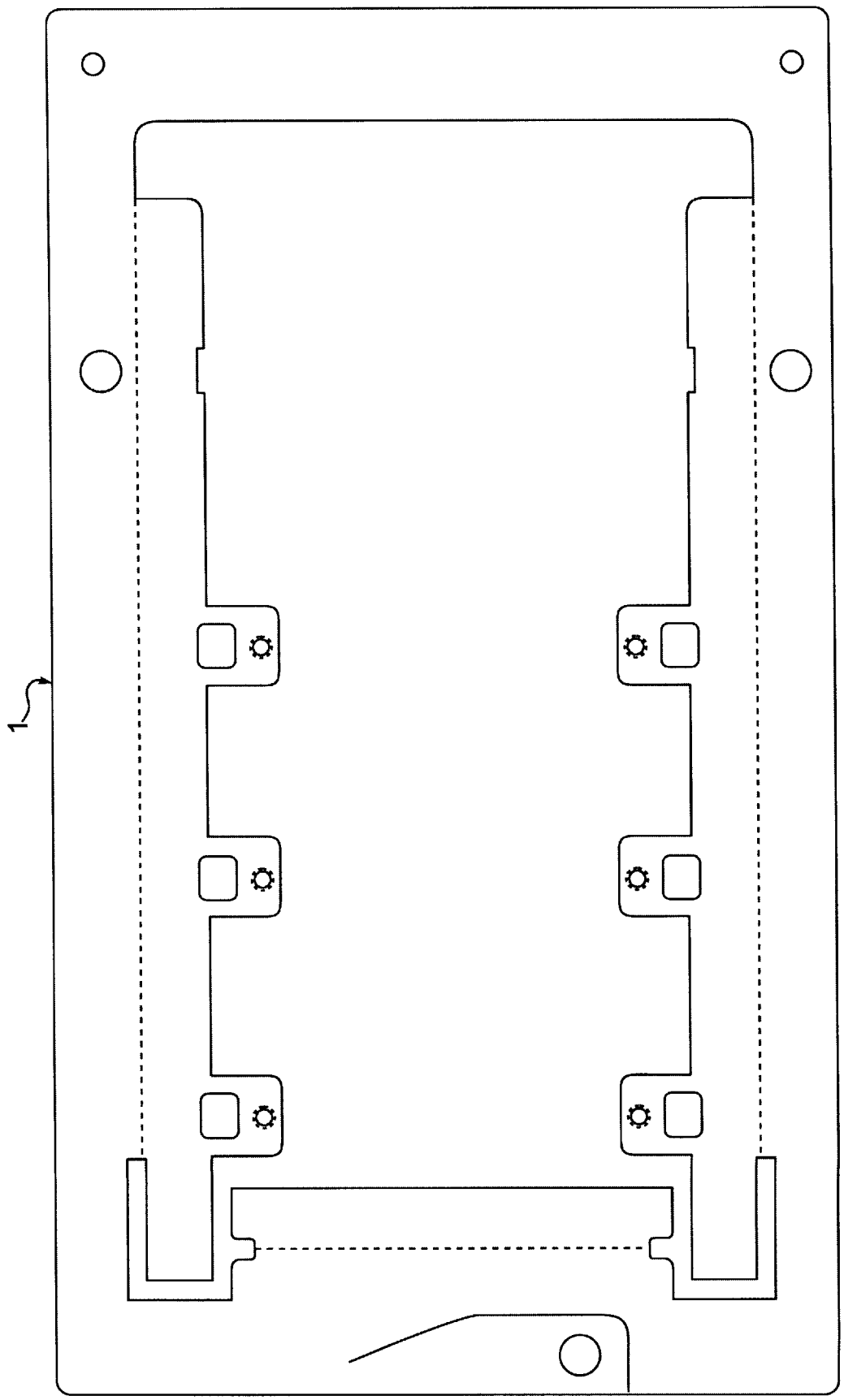
FIG. 4 is a front elevation view of the present invention sized to accept three CEBUS tap point units in combination with a single standard electrical receptacle.
Figure 5:
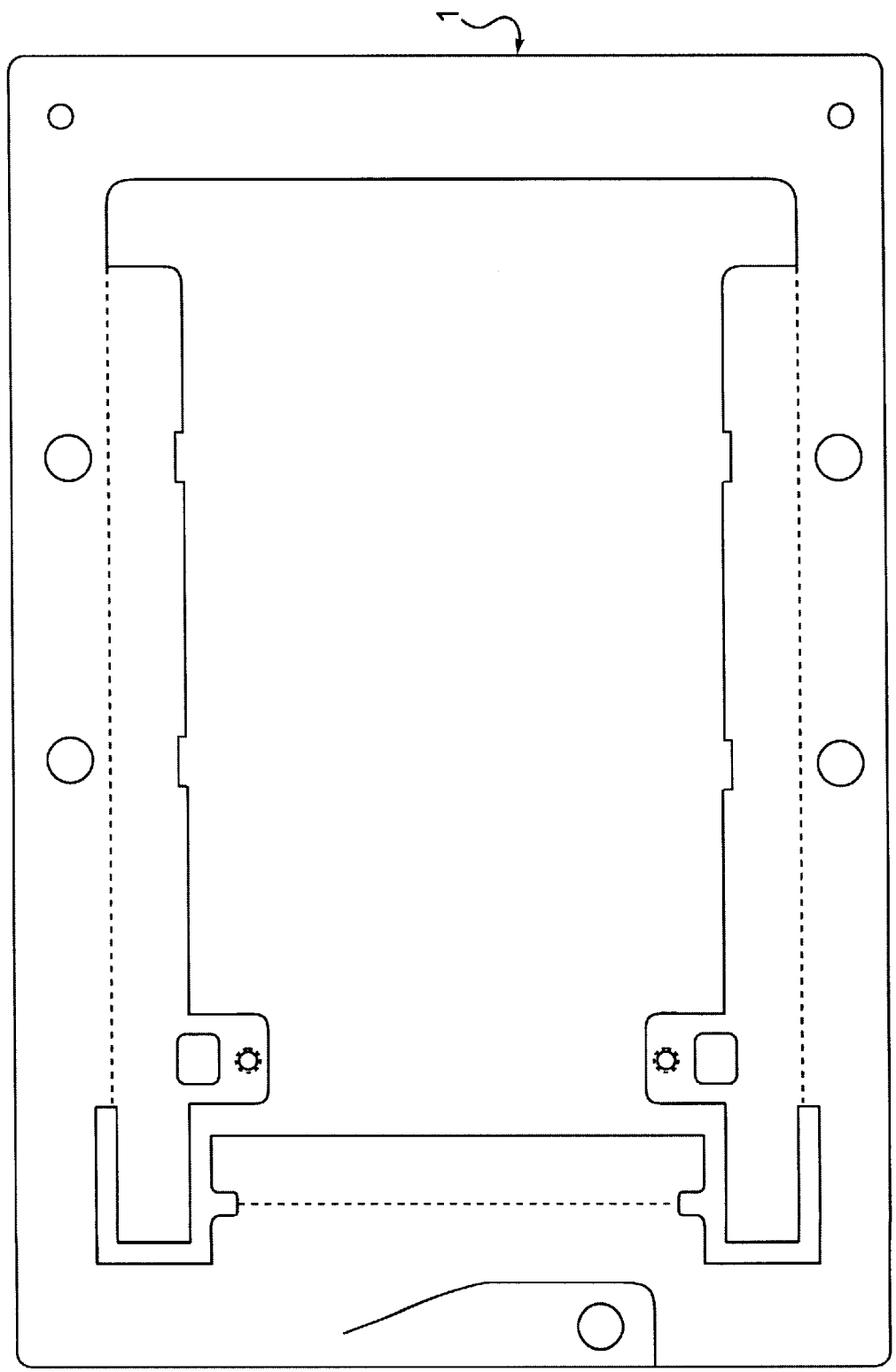
FIG. 5 is a front elevation view of the present invention sized to accept a single CEBUS tap point unit in combination with two standard electrical receptacles.
Figure 6:
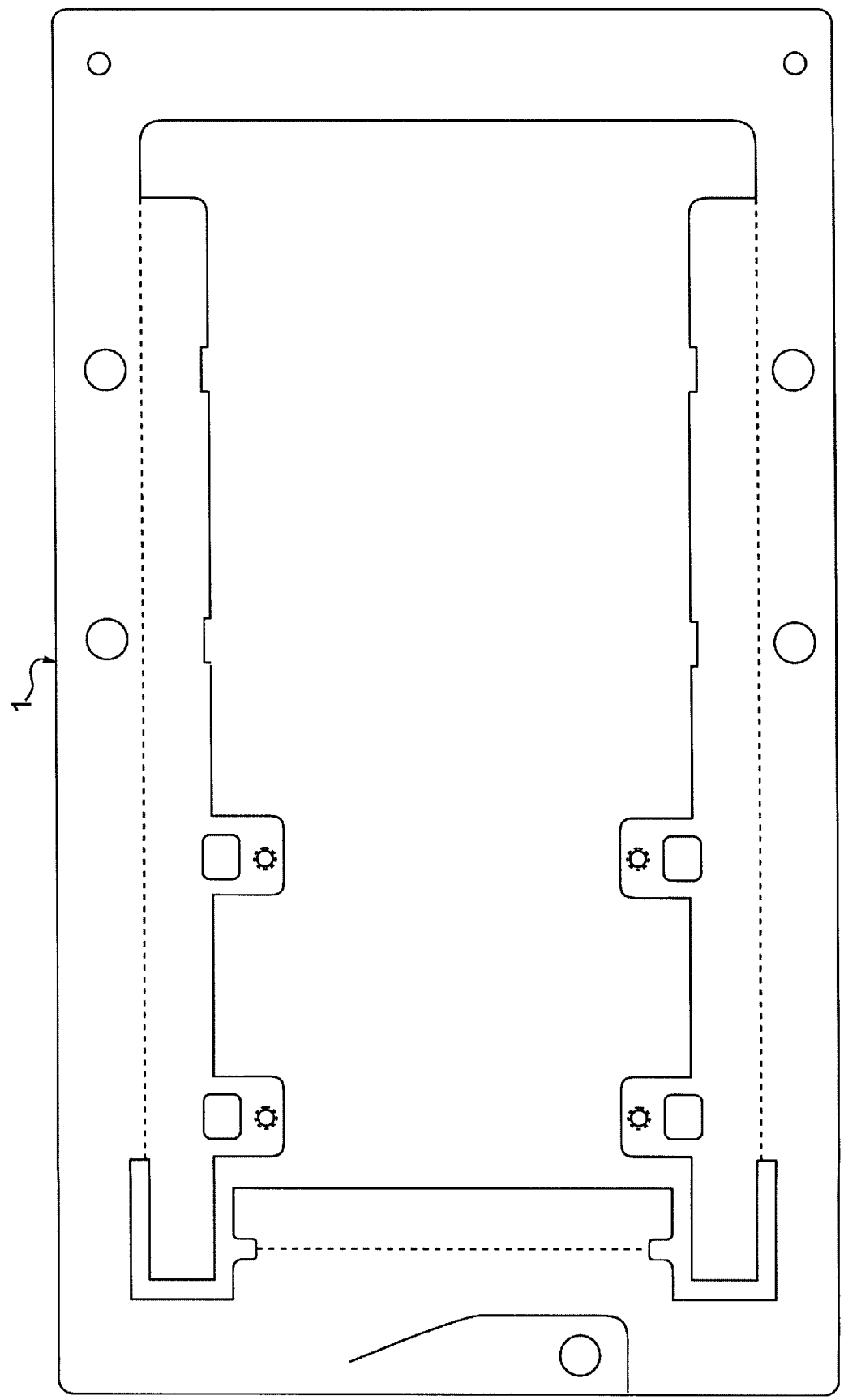
FIG. 6 is a front elevation view of the present invention sized to accept two CEBUS tap point units in combination with two standard electrical receptacles.

The rough-in bracket 1 of the present invention can be sized to accommodate one or more than one CEBUS tap point unit in various combinations with one or more than one standard electrical receptacles. FIG. 3 shows a rough-in bracket 1 sized to accept two CEBUS tap point units in combination with a single electrical receptacle to be covered by a standard three-gang electrical receptacle face plate. FIG. 4 shows a rough-in bracket 1 sized to accept three CEBUS tap point units in combination with a single electrical receptacle to be covered by a standard four-gang electrical receptacle face plate. Although not shown, the rough-in bracket 1 can be sized to accept three CEBUS tap point units in combination with two electrical receptacles to be covered by a standard five-gang electrical receptacle face plate by providing space for adding an electrical receptacle to the configuration shown in FIG. 4. FIG. 5 shows a rough-in bracket 1 sized to accept a single CEBUS tap point unit in combination with two electrical receptacles to be covered by a standard three-gang electrical receptacle face plate. FIG. 6 shows a rough-in bracket 1 sized to accept two CEBUS tap point units in combination with two electrical receptacles to be covered by a standard four-gang electrical receptacle face plate. It will be obvious to one skilled in the art that the rough in bracket design shown in FIGS. 1 and 2 can be adapted to any combination of CEBUS tap point units and electrical receptacles permitted by applicable electrical safety codes.

While a present preferred embodiment of the invention has been shown and described in particularity, the invention may be otherwise embodied within the scope of the appended claims.

What is claimed is:

1. A bracket for wall mounting at least one low voltage device comprising at least a tap point unit adjacent to at least one electrical receptacle, said bracket comprising a rigid border surrounding an opening sized and shaped to accept said at least one tap point unit in combination with said electrical receptacle, and further comprising alignment means located within said border at positions which permit said bracket to be aligned over an electrical receptical box containing said at least one electrical receptacle.

2. The bracket of claim 1, wherein said border is comprised of a metal.

3. The bracket of claim 1, further comprising at least one other set of openings located within said border for securing said bracket to said wall.

4. The bracket of claim 1, further comprising at least one other set of openings located within said border for attaching said at least one tap point unit to said bracket.

5. The bracket of claim 1, further comprising at least one flange attached to said border and at least partially surrounding said opening to support said at least one tap point unit and said at least one electrical receptacle.

6. The bracket of claim 1, further comprising at least one tab to support at said at least one tap point unit.

7. The bracket of claim 1, further comprising at least one tab for securing wire remaining from installation of said at least one tap point unit and said at least one electrical receptacle.

8. The bracket of claim 1, wherein said bracket is covered by at least one face plate sized to enclose said at least one tap point unit and said at least one electrical receptacle.

9. The bracket of claim 1, said bracket mount one said tap point unit and one said electrical receptacle.

10. The bracket of claim 1, said bracket mount two said tap point units and one said electrical receptacle.

11. The bracket of claim 1, said bracket mount three said tap point units and one said electrical receptacle.

12. The bracket of claim 1, said bracket mount one said tap point unit and two said electrical receptacles.

13. The bracket of claim 1, said bracket mount two said tap point units and two said electrical receptacles.

14. The bracket of claim 1, said bracket mount three said tap point units and two said electrical receptacles.

15. The bracket of claim 1, wherein said at least one tap point unit meets the Electronic Industry Association consumer Electronics Bus EIA-600 Standard.

16. The bracket of claim 1, wherein said at least one electrical receptacle is a standard electrical power outlet.

17. The bracket of claim 1, wherein said at least one electrical receptacle is a switch.

* * * * *